Oct. 25, 1966    B. J. PILLINER    3,280,680
CUTTING APPARATUS

Filed March 30, 1964    3 Sheets-Sheet 1

Inventor
B. J. PILLINER
By Holcombe, Wetherill + Brisebois
Attorneys

Oct. 25, 1966   B. J. PILLINER   3,280,680
CUTTING APPARATUS

Filed March 30, 1964   3 Sheets-Sheet 2

Inventor
B. J. PILLINER
By Holcombe, Wetherill + Brisebois
Attorneys

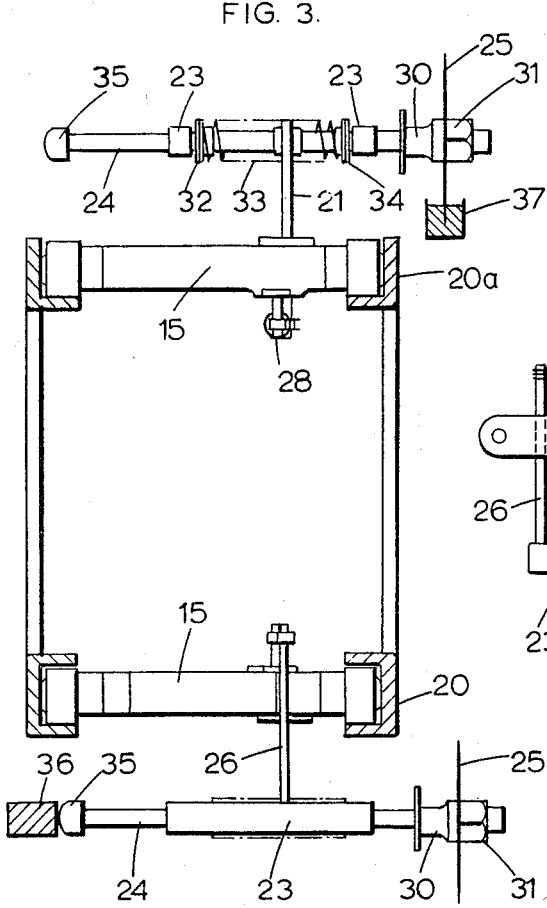
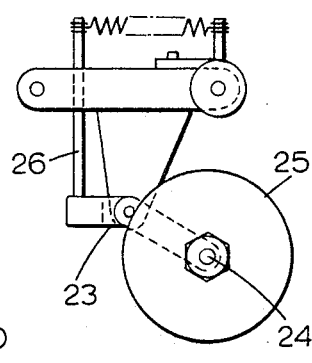

3,280,680
CUTTING APPARATUS
Bernard J. Pilliner, Chandler's Ford, England, assignor to
Rational Automation Limited
Filed Mar. 30, 1964, Ser. No. 355,791
Claims priority, application Great Britain, Apr. 3, 1963
13,167
5 Claims. (Cl. 83—168)

The present invention relates to apparatus for cutting moving material transversely of its direction to movement.

It forms an improvement in or modification of the apparatus described and claimed in my British Patent No. 878,089. In that patent there is claimed apparatus for cutting moving material transversely of its direction of movement, comprising a cutter member, means for rotating the cutter member about a longitudinal axis, so that said member moves bodily along a substantially circular path and so that said member passes transversely through the material once during each revolution, and means including a cam member extending across the material for moving the cutter member longitudinally in the same direction as the material during passage of said member through the material; the speed of rotation of the cutter member, the speed of longitudinal movement of said member, and the speed of the material being so related that the material is cut along a predetermined line.

According to the present invention there is provided apparatus for cutting moving material transversely of its direction of movement, comprising at least one cutter member, means for moving the cutter member bodily along a closed path passing around an axis longitudinally of the direction of movement of the material so that it passes through the material once in each traverse of its path, and means including a cam member extending across the material for moving the cutter member longitudinally in the same direction as the material during its passage through the material; the speed of movement of the member along its path, the speed of longitudinal movement of the member and the speed of the material being so related that the material is cut along a predetermined line.

The various features and advantages of the invention will be apparent from the following description of an exemplary embodiment illustrated in the drawings accompanying the provisional specification in which:

FIGURE 3 is a diagrammatic end view, partly in section, of the apparatus; and

FIGURE 4 is a detail view of a cutter assembly, with a modified support bracket.

Figure 1:
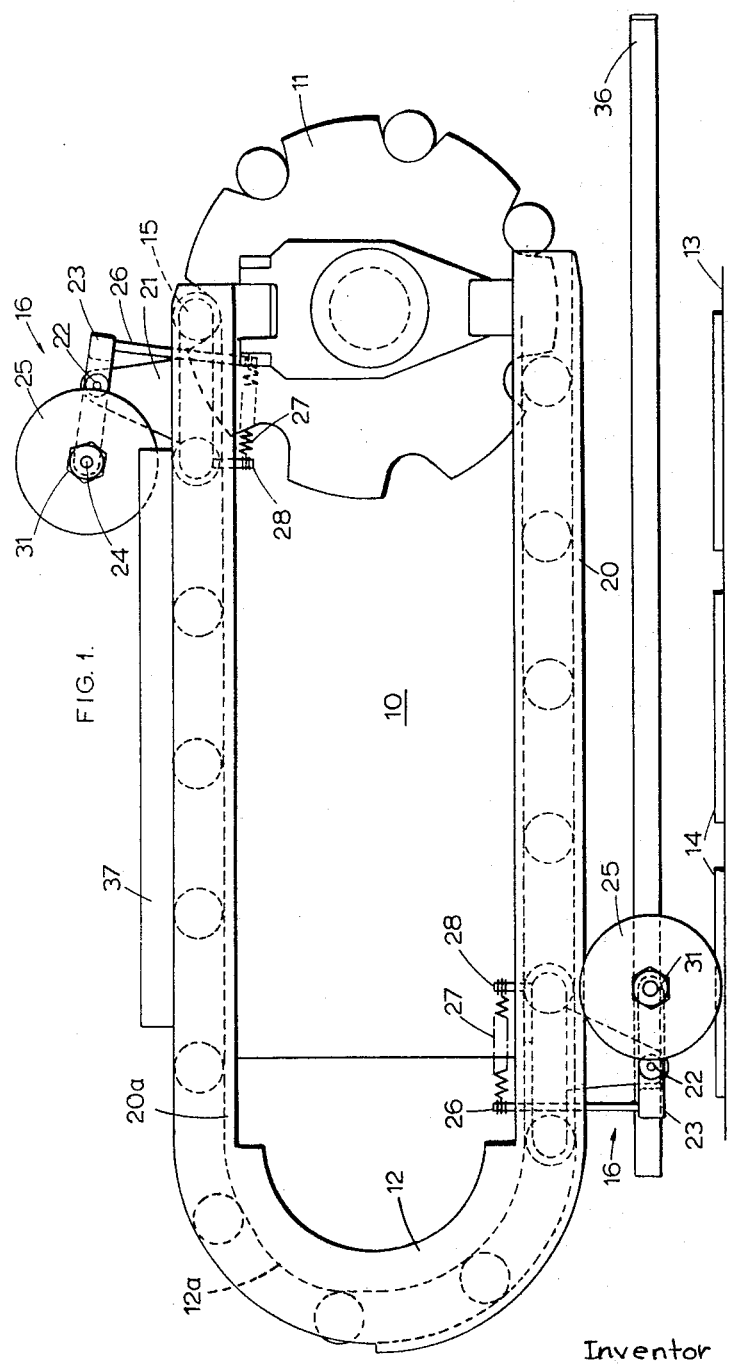
FIGURE 1 is a diagrammatic side elevation of the apparatus.
Figure 2:
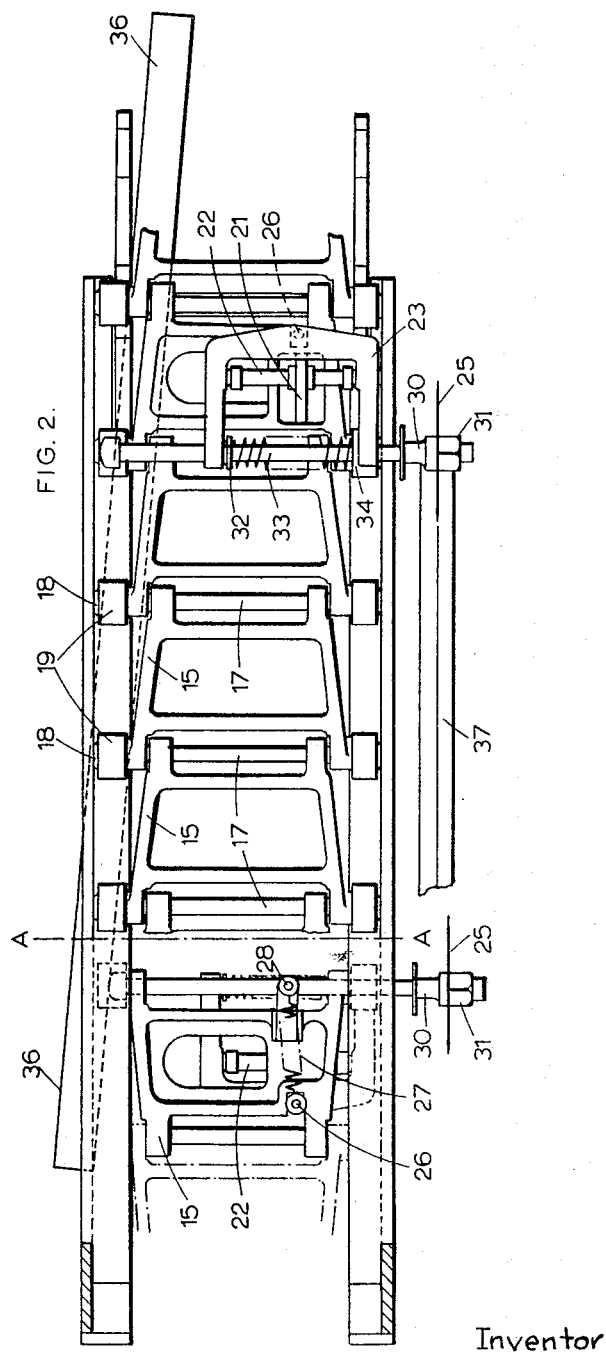
FIGURE 2 is a composite plan view of the apparatus taken from above to the right of the line A—A, and from underneath to the left of line A—A.

The apparatus comprises an endless chain conveyor 10, the chain of which is driven by a sprocket 11 at one end of the run and passes over a semi-circular guide 12 at the other end of the run. The conveyor 10 is mounted over a conveyor belt indicated by the line 13 for the material 14 to be cut, with the direction of movement of the chain transverse to the belt 13 and one or more of the links 15 of the chain carry cutter assemblies 16. Two such assemblies are shown in FIGURES 1 and 2 but it will be appreciated that a single cutter assembly or as many assemblies as there are links could be used depending upon the relative speeds of movement of the two conveyors and the desired frequency of cuts along the length of the material.

The pin 17 of each link 15 is of stainless steel and has nylon end pads 18 and carries at its ends free-running nylon rollers 19 which run in a lower channel section guide 20 and an upper angle guide 20a between the ends of the conveyor. Extending outwardly of the conveyor from the links 15 carrying cutter assemblies are triangular rods 21 through the outermost ends of which pass shafts 22 on which are pivotably mounted U-shaped brackets 23 each of which at the free ends of the limbs of the U provides bearings for a spindle 24 carrying a circular cutter blade 25. From the base of the U of each bracket 23 a rod 26 projects inwardly through the link 15 of the conveyor chain and the free end of rod 26 is connected by a tension spring 27 to a post 28 mounted on the pin 17 of the link 15.

Each cutter blade 25 is held in position on its spindle 24 between a flanged stop member 30 and a nut 31 and the spindle 24 is free to rotate in the bearings provided by bracket 23 so that the cutter blade can rotate during its cutting action. Adjacent one limb of bracket 23 an end stop 32 is secured to spindle 24 and provides an end seating for a compression spring 33 the other end of which bears against a similar end stop 34 adjacent the other limb of bracket 23 and slidably mounted on spindle 24. The end of spindle 24 remote from cutter blade 25 has a cap 35 which bears against a cam surface 36 during movement of the chain along the cutting run of the conveyor. This surface 36 is inclined at an angle to the direction of movement of the conveyor 10 so that the blade 25 is given a component of movement in the direction of movement of the material 14 as the cutting action takes place so that the cut made is transverse to the material and not oblique as would otherwise be the case. The angle of inclination of cam surface 36 is a function of the relative speeds of movement of the two conveyors 10 and 13.

As the end cap 35 is displaced by the cam surface 36 the spindle 24 carries end stop 31 towards end stop 33 thus compressing spring 32 and when cap 35 clears surface 36 spring 32 restores shaft 24 to its original position.

The tension spring 27 acting between the post 28 and the rod 26 is arranged to permit a degree of tilt of the bracket 23 such that the cutter blade 25 will cut through the material 14 without damaging the conveyor 13. Preferably the arrangement is such that the median of a line joining the point of contact of the blade 25 with conveyor 13 and the point of contact of the blade with the upper surface of the material 14 passes just in front of the pivotal axis provided by shaft 22, and with thicker material to be cut the modified form of bracket shown in FIGURE 4 is preferably used. In FIGURE 4 the bracket 23 is bent from the pivot point provided by the shaft 22 towards the end carrying the spindle 24 and the effect of this is to bring the median line closer to the axis of shaft 22 than is the case with the straight bracket of FIGURE 1.

The guide surface provided by the semi-circular guide 12 has a raised portion 12a which has the effect of tensioning the chain of the conveyor 10 as each link moves into engagement with the sprocket at the end of the straight section of the cutting run thus taking up the slack which would otherwise occur.

On the return run each cutter blade 25 travels through a trough 37 which may contain a wetting agent and/or may be fitted with wire brushes or other arrangements for cleaning the cutter blades.

Instead of using a chain having relatively large links, each somewhat longer than the length of the cutter assembly it supports, a chain of smaller link could be employed to move pairs of shafts serving the function of pins 17, there being one such pair of shafts for each cutter assembly.

What I claim is:

1. Apparatus for cutting material, comiprsing means for supporting and continuously moving material in a given direction, an endless chain, means for supporting said chain in a position in which it extends transversely to the direction of movement of the material, means for driving said chain, a carriage mounted on said chain for movement therewith, a cutter mounted on said carriage for movement relative to said carriage in the direction of movement of the material, and a straight cam member extending transversely of the direction of movement of the material for controlling displacement of the cutter relative to said carriage, whereby said cutter is guided to sever the material on a predetermined line.

2. Apparatus according to claim 1 wherein said cutter member comprises a disc mounted on a shaft which is capable of axial and rotational movement in said carriage, one end of the shaft engaging said cam member so as to cause longitudinal movement of the cutter member.

3. Apparatus according to claim 1 wherein said cutter member is mounted so as to yield resiliently in a direction perpendicular to the plane in which, in use, the material moves.

4. Apparatus according to claim 1 comprising a cleaning device for the cutter member extending over a part of the path.

5. Apparatus for cutting material, comprising feeding means for supporting and continuously moving the material in a given direction in a plane, an endless chain mounted to have spaced reaches, one of said reaches extending substantially parallel with said plane and transversely to said given direction, means for continuously driving said chain, at least one carriage secured to said chain for movement therewith, a shaft rotatably and axially movable in said carriage, said shaft extending parallel with said given direction, a cutter disc secured at its center to said shaft, a straight cam member extending across said feeding means adjacent said one reach of said chain, means surging said shaft axially to engage said cam member whereby said member will control the axial position of said shaft relative to said carriage when said carriage traverses said one reach, and resilient means urging said cutter towards said plane of said feeding means when said carriage traverses said one reach.

References Cited by the Examiner

UNITED STATES PATENTS

| | | | |
|---|---|---|---|
| 1,118,460 | 11/1914 | Winkley | 83—326 X |
| 1,619,975 | 3/1927 | Hawkins | 83—318 X |
| 1,737,146 | 11/1929 | Castricum. | |
| 2,283,838 | 5/1942 | Williams | 83—337 X |
| 2,674,310 | 4/1954 | Thornley | 83—329 X |
| 3,149,517 | 9/1964 | Frydryk | 83—353 X |

FOREIGN PATENTS 878,089    9/1961   Great Britain.

WILLIAM W. DYER, JR., *Primary Examiner.*

J. M. MEISTER, *Assistant Examiner.*